United States Patent [19]

Shiokama

[11] Patent Number: 5,400,109
[45] Date of Patent: * Mar. 21, 1995

[54] POWER-DRIVEN FOCUSING APPARATUS

[75] Inventor: Yoshiharu Shiokama, Kawasaki, Japan

[73] Assignee: Nikon Corporation, Tokyo, Japan

[*] Notice: The portion of the term of this patent subsequent to Apr. 29, 2009 has been disclaimed.

[21] Appl. No.: 165,547

[22] Filed: Dec. 13, 1993

Related U.S. Application Data

[63] Continuation of Ser. No. 988,027, Dec. 9, 1992, abandoned, which is a continuation of Ser. No. 740,209, Aug. 5, 1991, abandoned.

[30] Foreign Application Priority Data

Aug. 8, 1990 [JP] Japan .................. 2-209631

[51] Int. Cl.⁶ .............................................. G03B 13/34
[52] U.S. Cl. ................................. 354/402; 354/195.1
[58] Field of Search ................... 354/195.1, 400, 402

[56] References Cited

U.S. PATENT DOCUMENTS 5,109,245  4/1992  Shiokama ................ 354/195.1

FOREIGN PATENT DOCUMENTS 59-64816  4/1984  Japan .

Primary Examiner—W. B. Perkey
Attorney, Agent, or Firm—Shapiro and Shapiro

[57] ABSTRACT

A photographing apparatus for electrically detecting manipulation of a manually manipulated member and driving a photographing lens into an in-focus state by driving a motor in accordance with the manipulation comprises a continuous drive device for driving the lens by driving the motor for a time corresponding to a manipulation time when the manual manipulation member is continuously manipulated longer than a predetermined time, and a fine drive device for driving the motor to drive the lens by a predetermined amount per manipulation which is independent from the manipulation time and variable in accordance with a photographing condition when the manual manipulation member is manipulated shorter than the predetermined time.

24 Claims, 7 Drawing Sheets

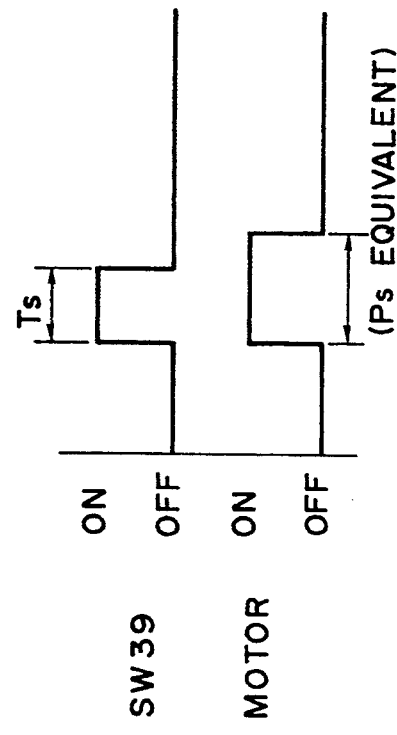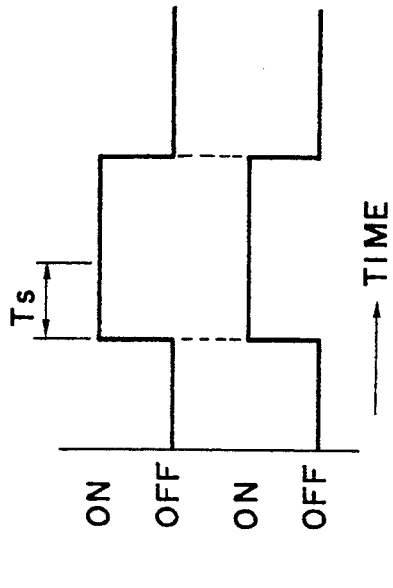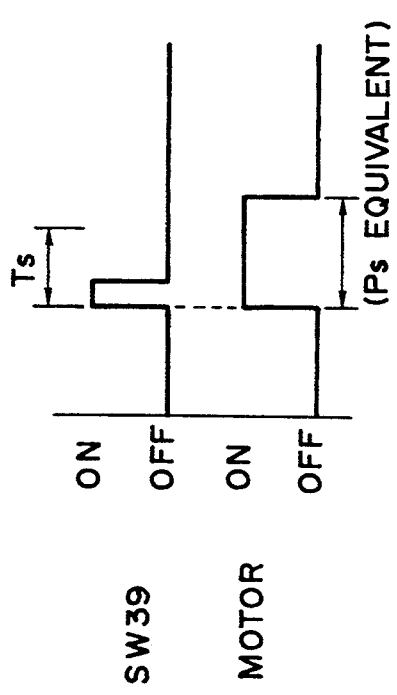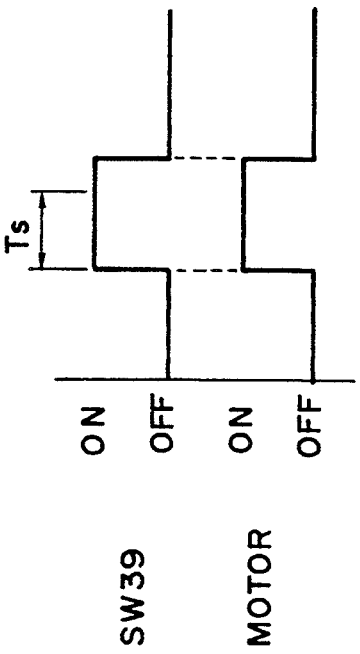

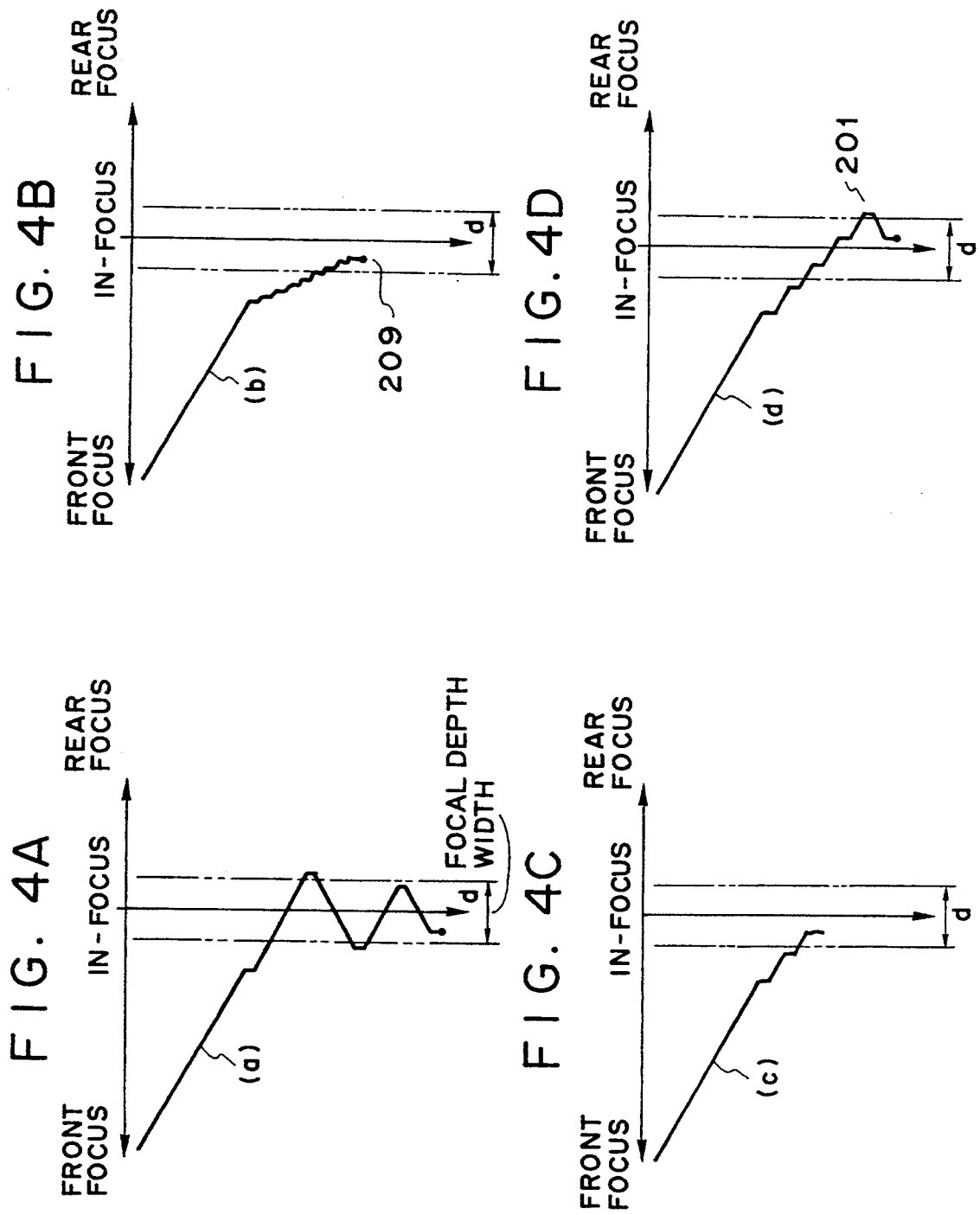

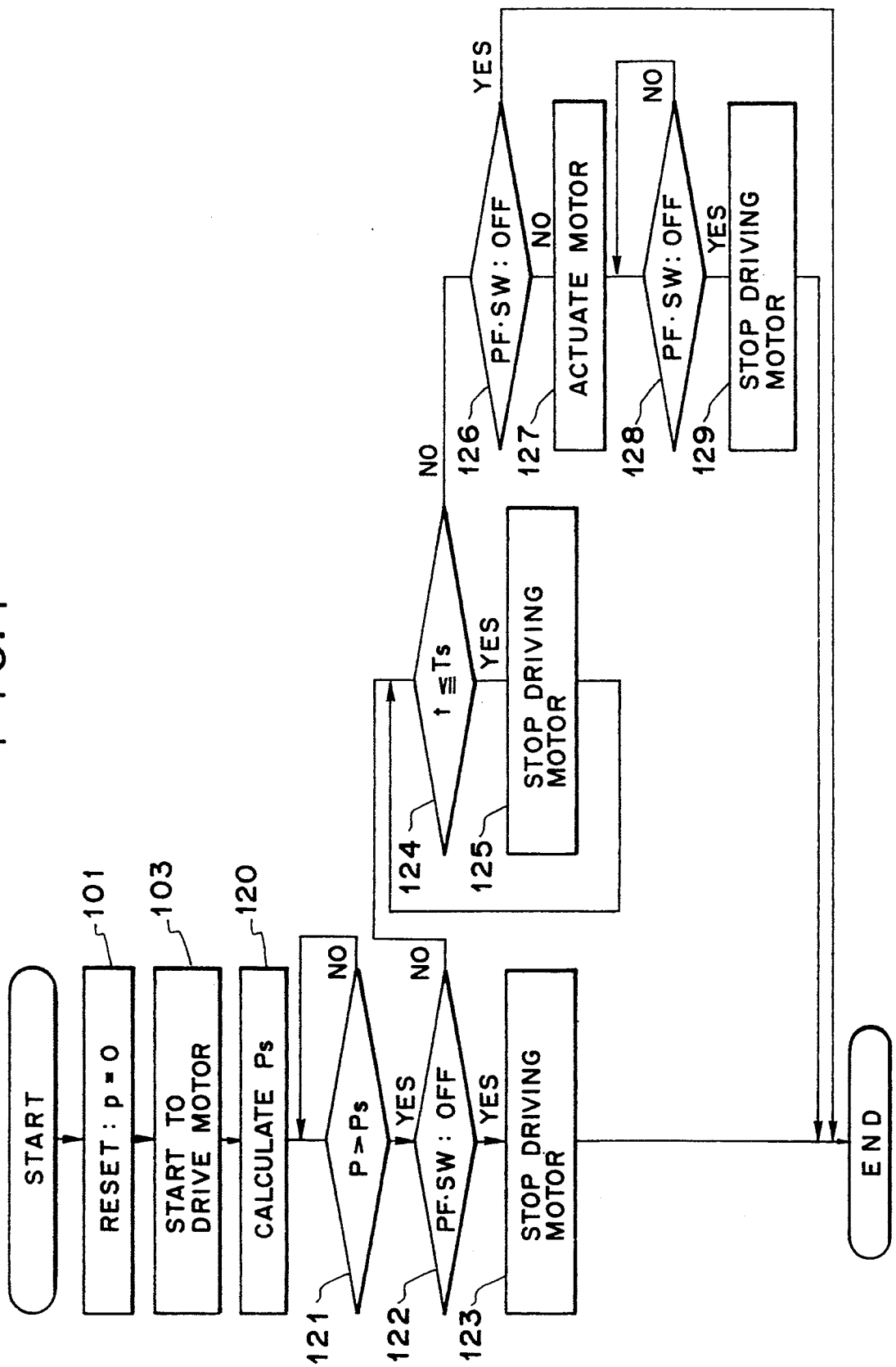

POWER-DRIVEN FOCUSING APPARATUS

This is a continuation of application Ser. No. 988,027, filed Dec. 9, 1992, now abandoned, which is a continuation of application Ser. No. 740,209, filed Aug. 5, 1991, now abandoned.

BACKGROUND OF THE INVENTION

1. Field of the Invention

The present invention relates to a power-driven focusing apparatus known as a power focusing device which drives a motor by a manually actuated switch to drive a photographing lens to an in-focus position.

2. Related Background Art

In prior art focusing for photographing, a rotational movement of a ring-shaped focusing ring is mechanically translated to a linear movement by a helicoid screw mechanism or a cam mechanism to drive a lens, and manipulation feeling as a human operated tool is very good.

However, as auto-focusing cameras have increased recently, the focusing of the photographing lens by a motor drive has become common, and a so-called power focusing mechanism which turns on or off an electrical switch in accordance with the actuation of a manually manipulated member such as a push button or a sea-saw lever and controls the rotation of a motor in accordance with the switch signal to drive the focusing lens has been widely adopted.

However, in such a power focusing mechanism, since structures of the switch and the manually manipulated member are different from that of the ring-shaped focusing ring in the prior art mechanical focusing device, the same good manipulation feeling as that in the prior art device is not attained and this makes the fine adjustment of focusing very difficult.

As an approach thereto, it has been proposed to use a rotary dial or ring as the manipulation member, detect the rotation thereof by a rotary encoder and control the motor in accordance with the detected rotation. This method provides good manipulation feeling but the mechanism to detect the rotation is complex and precise and software to control the motor is also complex. As a result, it is disadvantageous in cost and manufacture.

It has also been proposed to use a power focusing device which uses a push button of a simple structure to detect an actuation time of the switch, control the motor in accordance with the actuation time of the switch so that the motor is driven during the actuation of the switch if the actuation time is long while the motor drive is controlled to a constant amount if the actuation time is shorter than a predetermined period. (Japanese Laid-Open Patent Application No. 59-64816) In this method, the fine adjustment of the focusing is attained relatively easily, but it is necessary to intermittently manipulate the manipulation member many times during the fine adjustment stage of the focusing, and quick focusing operation is hard to attain.

SUMMARY OF THE INVENTION

In the light of the above, it is an object of the present invention to provide a power-driven focusing device which is simple in structure and permits quick fine adjustment of the focusing.

The present invention is applied to a photographing device having a so-called power focusing device which electrically detects the manipulation of a manually manipulated member, that is, a power focusing switch and drives a motor in accordance with the manipulation to drive a lens to an in-focus position.

In such a photographing device, the present invention provides continuous drive means for driving the lens by the motor for a time period corresponding to the manipulation time of the manually manipulated member when it is continuously manipulated over a predetermined time period, and fine drive means for driving the lens by the motor by a constant amount determined by an effective set F number of the photographing lens without regard to the manipulation time, for each manipulation when the manipulation time of the manipulation member is shorter than the predetermined time period.

The amount of displacement of the lens by the fine drive means which is activated in the fine adjustment of the focusing when the manipulation time is short is varied in proportion to a focal depth for the effective set F number of the photographing lens. Specifically, the motor is driven by the amount which causes movement of an image plane by a focal depth corresponding to the effective F number of the lens which is set at an exposure mode, to one half of the focal depth.

The amount of lens drive by the motor in the fine adjustment of the focusing by the fine drive means may also be determined, instead of by the focal depth, by a contrast of an object, an amount of defocusing defined as a deviation of a focal plane of the object from a designed focal plane, the presence or absence of movement of the object, a brilliance of the object, a distance to the object and a focal distance and an open F number of the photographing lens.

In the power-driven focusing device of the present invention thus constructed, the amount of lens drive by the motor in the fine adjustment of the focusing corresponds to the focal depth in the photographing mode.

Accordingly, a probability of making an out-of-focus photograph is low. Further, when the F number is large, the amount of lens drive per power focusing operation is large and the number of times of switch manipulation to reach the in-focus position is smaller and the focusing is attained more efficiently and quickly.

Further, since the structure of the switch is relatively simple, it is very advantageous in cost and manufacture.

Where the amount of lens drive by the motor in the fine adjustment of the focusing is determined in accordance with the contrast of the object, the amount of defocusing, the presence or absence of the movement of the object, the brilliance of the object, the distance to the object, or the focal distance or the open F number of the photographing lens, efficient and quick focusing operation is also attained.

BRIEF DESCRIPTION OF THE DRAWINGS

FIGS. 3A to 3D show relationship between the switch manipulation and the motor drive in the present invention, FIGS. 4A to 4D show comparison with prior art of loci of the lens drive in the power focusing mode in the present invention, FIG. 7 shows a flow chart for the motor drive process of FIGS. 5A to 5C.

DETAILED DESCRIPTION OF THE PREFERRED EMBODIMENTS

Figure 1:
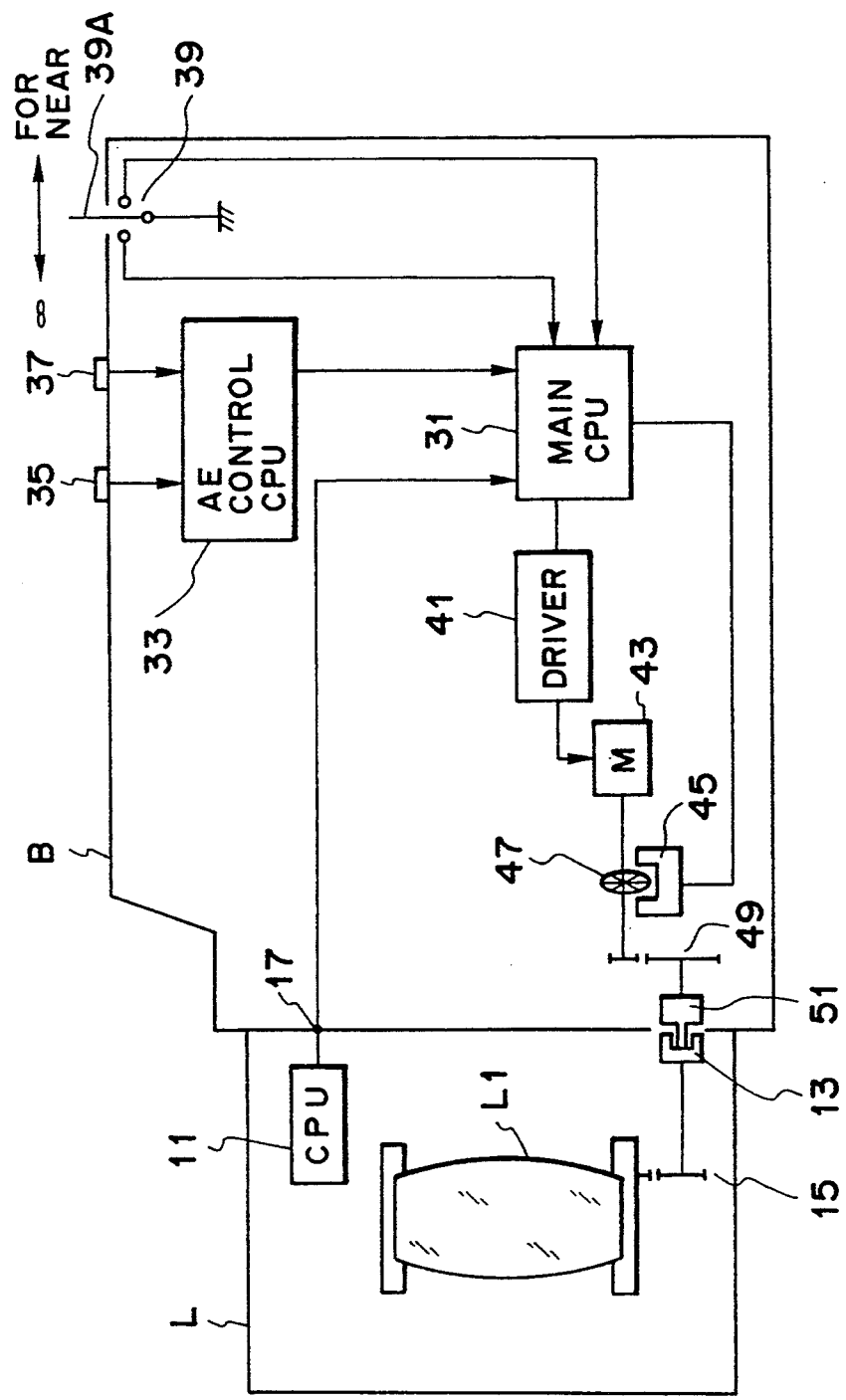
FIG. 1 shows a configuration of one embodiment of the present invention.

FIG. 1 shows a configuration of an embodiment of the present invention applied to a camera system with an exchangeable photographing lens.

In FIG. 1, an exchangeable lens L comprises focusing lenses L1, a microcomputer (CPU) 11 having lens data to be sent to a camera body B stored in a memory, a coupling 13 for receiving a motor drive force from the body B, and reduction gears 15 for driving the lenses.

The camera body B contains a main CPU 31 which controls the power focusing and an AE control CPU 33 which controls the exposure. The AE control CPU 33 controls an exposure mechanism (not shown) and selects exposure modes such as a programmed AE mode, an iris-prioritized AE mode, a shutter speed prioritized AE mode and a manual exposure mode in accordance with a setting of an AE mode selector 35. In the manual exposure mode and the iris-prioritized AE mode, an F number Fs determined by a setting of an F number setting switch 37 is sent to the main CPU 31. In the programmed AE mode and the shutter speed prioritized AE mode, a control F number Fs determined by the program is sent to the main CPU 31. A power focusing switch 39 which includes a manipulation knob 39A sends a "∞ direction command Signal" or a "far-near direction command signal" to the main CPU 31 by manipulating the manipulation knob 39A in the "∞" direction or the far-near" direction as shown.

The main CPU 31 sends a drive control signal for a lens drive motor 43 to a drive circuit 41 in accordance with the F number data Fs from the AE control CPU 33 and the command signal from the power focusing switch 39. The drive circuit 41 controls the drive of the motor 43 in accordance with the drive control signal. The rotation of the motor 43 causes the rotation of the coupling 51 through the reduction gears 49. An encoder disk 47 having slit-shaped light transmissive areas for detecting the motor rotation is mounted on a motor shaft, and it generates, together with a photo-interrupter 45, a feedback pulse which represents the motor rotation. It is sent to the main CPU 31.

The CPU 11 in the lens and the main CPU 31 are interconnected through electrical contacts 17 at a mount so that the open F number of the lens and image plane displacement data Ac per unit rotation of the coupling 13 are sent from the lens L to the body B.

Figure 2:
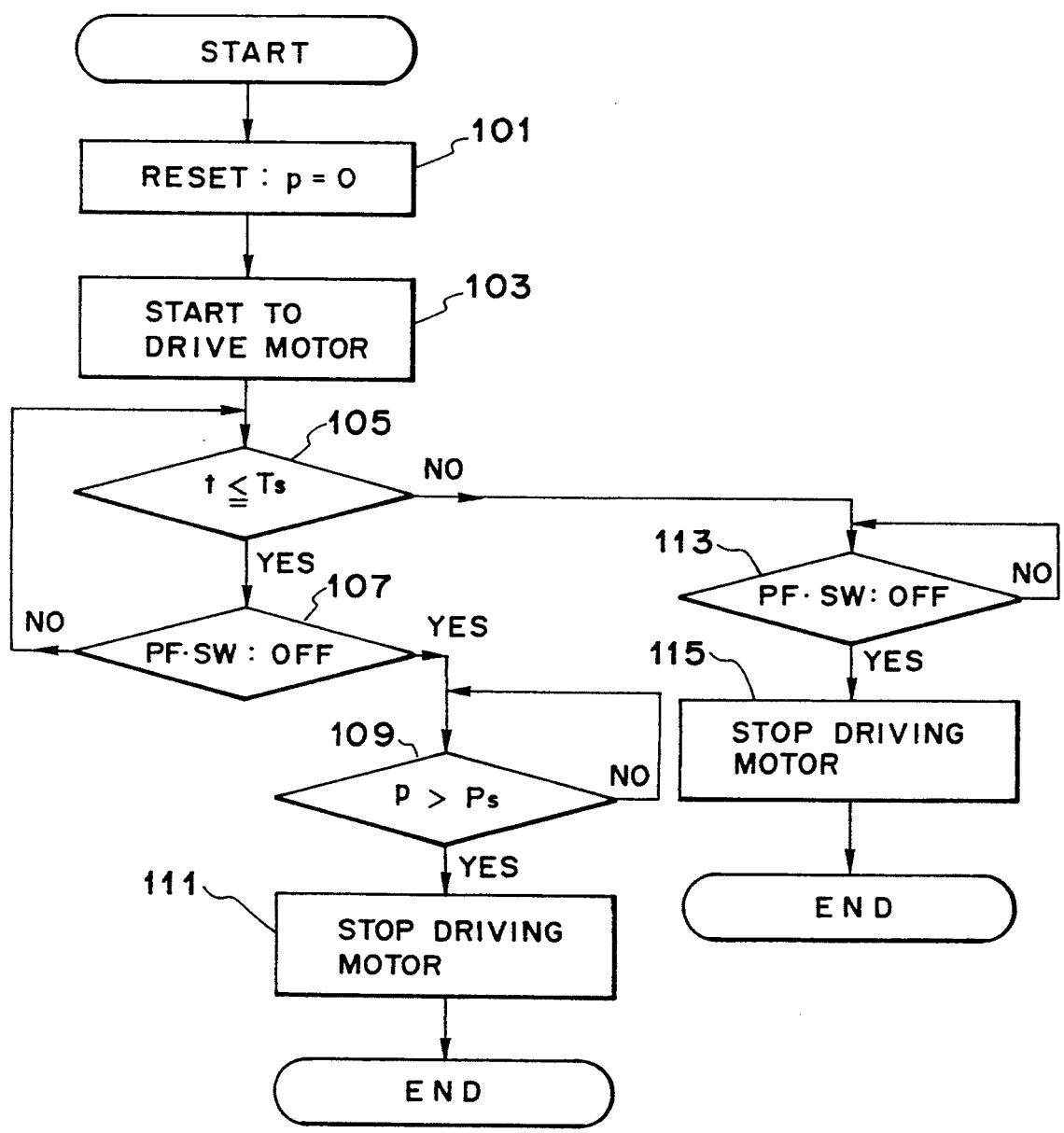
FIG. 2 shows a flow chart of a control process in the present invention.

FIG. 2 shows a flow chart of a motor control algorithm in the power focusing device of the present invention. The operation of the embodiment of FIG. 1 is explained with reference to FIG. 2.

When the manipulation knob 39A of the power focusing switch 39 is manipulated to close the contact of either "∞" or "far-near", the corresponding command signal is sent to the main CPU 31 and the control program shown in FIG. 2 starts.

In a step 101, a counter P which counts the feedback pulses from the photo-interrupter 45 is reset to P=0. In a step 103, the drive of the motor 43 is started. Thus, the motor 43 is rotated by the drive signal from the main CPU 31 and the lens is driven through the reduction gears 49, the couplings 51 and 13 and the reduction gears 15 in the lens L so that the focusing lens L1 is driven along an optical axis to start the focusing. During the drive of the motor, the feedback pulses are generated from the photo-interrupter 45 by the rotation of the encoder disk 47 and the pulses are counted by the counter P.

In a step 105, an elapsed time from the start of the power focusing is monitored to determine if a predetermined time Ts has elapsed or not. The predetermined time Ts is used to determine whether the fine adjustment of the focusing has been done or the coarse adjustment of the focusing has been done. The predetermined time Ts may be several tens ms to several hundreds ms although it depends on the structure of the power focusing switch.

When the elapsed time t does not reach the preset time Ts in the step 105, the process proceeds to a step 107 to determine whether the power focusing switch (PF·SW) 39 has been continuously manipulated or not. If it has been, the process returns to the step 105. In this manner, the step 105 to check the elapsed time t and the step 107 to check the manipulation of the power focusing switch 39 are repeatedly carried out. If the power focusing operation is released within the preset time Ts, a decision is made that it is the fine adjustment of the focusing to finely conduct the power focusing, and the process proceeds to a fine drive routine of steps 109 and 111. If the elapsed time t exceeds the preset time Ts, a decision is made that it is the coarse adjustment of the focusing and the process proceeds to a continuous drive routine of steps 113 and 115.

In the continuous drive routine of the steps 113 and 115, the motor is continuously driven in the step 113 while the power focusing switch (PF·SW) 39 is turned on to conduct the power focusing, and the motor drive is stopped in the step 115 when the power focusing switch (PF·SW) 39 is turned off to terminate the power focusing.

In the fine drive routine of the steps 109 and 111, the motor is driven to drive the lens by the constant amount for each manipulation of the power focusing switch 39.

The term "constant amount" used herein means the amount determined by a control stop value Fs currently sent from the AE control CPU 33 to the main CPU 31. More specifically, it is an amount of motor rotation to drive the lens to move the image plane by a distance corresponding to the focal depth or one half thereof for the stop value Fs. The number Ps of feedback pulses of the motor rotation corresponding to the "constant amount" is given by $$Ps = (Fs/30)/(Ac/Nb) \infty 2 \times (Fx/30)/(Ac/Nb)$$

where

Ac: Displacement of the image plane per revolution of the coupling 13

Nb: Number of feedback pulses generated per revolution of the coupling 51

Fs/30: One of the focal depth to the stop value Fs

In the step 109, whehter the motor drive amount (the number P of counted pulses) has reached a predetermined drive amount Ps or not, and if it has not, the motor is continuously driven until it reaches. When the drive by the pulses Ps is completed, the process proceeds to a step 111 to stop the motor drive and terminate the fine drive.

While 1/30 of the F number is used as the focal depth as it is commonly used, it may be changed depending on the condition. For example, a manipulation member which permits a photographer to set a size of print of a photograph or a print magnification factor may be provided in the camera and the focal depth may be variably controlled in accordance with the setting so that the focal depth is smaller when the magnification factor is larger.

In order to impart more freedom to the photographer, a manipulation member which permits the photographer to freely set the focal depth may be provided in the camera and the constant amount drive in the fine drive routine may be controlled in accordance with the setting. Alternatively, a setting member which permits the direct setting of the "constant amount" of the drive in the fine drive routine instead of setting the focal depth may be provided.

FIG. 3 shows the relationships between the manipulation status of the power focus switch (PF·SW) 39 and the motor drive in the present invention, in four cases shown in FIGS. 3A to 3D.

In FIG. 3A, the manipulation time of the power focus switch 39 is shorter than the preset time Ts. The motor is driven even after the turn-off of the power focus switch 39 and the motor is driven by the amount corresponding to the preset number Ps of feedback pulses. In FIG. 3B, the manipulation time of the power focus switch 39 is equal to the preset time Ts. The motor is driven even after the turn-off of the power focus switch 39 and the motor is driven by the amount corresponding to the preset number Ps of feedback pulses. In FIGS. 3C and 3D, the manipulation time of the power focus switch 39 is longer than the preset time Ts. The motor drive is stopped when the power focus switch 39 is turned off.

In the example shown FIG. 3, the time required to drive the motor by the amount corresponding to the preset number Ps of feedback pulses is longer than the preset time Ts. In this cased the drive corresponding to the preset number Ps of feedback pulses may be attained even if the fine drive routine is started when the preset time Ts has elapsed. However, if the displacement Ac of the image plane per revolution of the coupling 13 in the formula for calculating the preset number Ps of feedback pulses is large, the preset number Ps of feedback pulses is small and the time required for the drive corresponding to the number Ps of pulses is short. In such a case, the time required for the drive corresponding to the preset number Ps of feedback pulses is shorter than the preset time Ts, and, as a result, even if it is attempted to start the fine drive routine when the preset time Ts has elapsed, the amount of drive may have already exceeded the preset number Ps of feedback pulses. A drive method for such a case is explained with reference to FIG. 5.

Figure 5A:
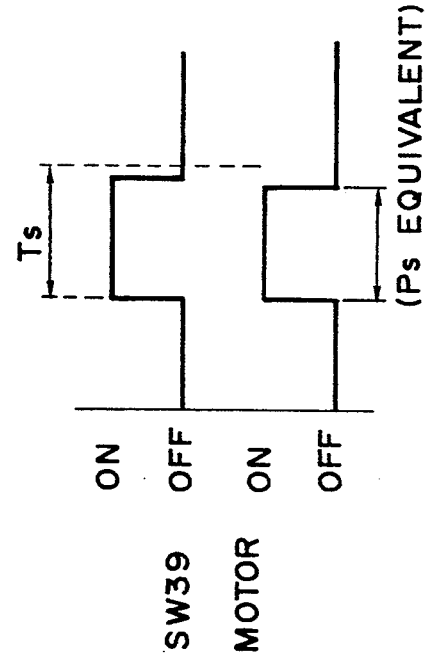
FIGS. 5A to 5C show relationships between the switch manipulation and the motor drive in the present invention.
Figure 5B:
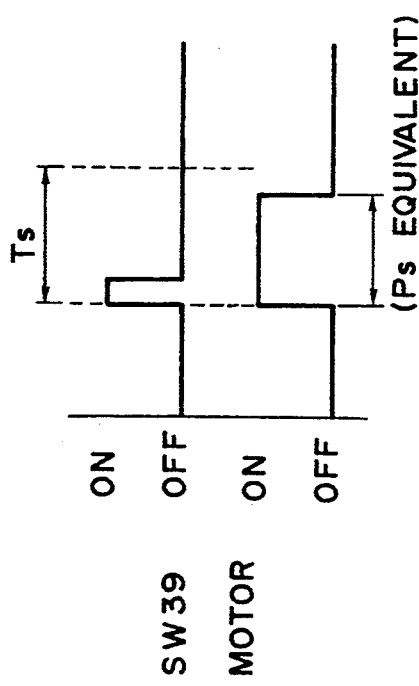
Figure 5C:
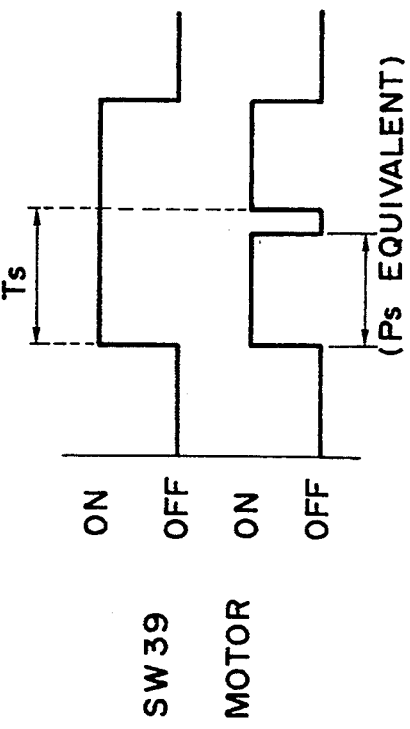

As shown in FIG. 5A, when the power focus switch 39 is turned off in a shorter time than the time required for the drive corresponding to the preset number Ps of feedback pulses, the fine drive routine may be started when the power focus switch 39 is turned off. As shown in FIG. 5B, when the power focus switch 39 is kept on for a time which is longer than the time required for the drive corresponding to the preset number Ps of feedback pulses and shorter than the preset time Ts, the motor drive is stopped when the drive corresponding to the preset number Ps of feedback pulses is completed even if the power focus switch 39 is kept on. As shown in FIG. 5C, when the power focus switch 39 is kept on for a time which is longer than the time required for the drive corresponding to the preset number Ps of feedback pulses and longer than the preset time Ts, the motor drive is temporarily stopped when the drive corresponding to the preset number Ps of feedback pulses is completed even if the power focus switch 39 is kept on, and if it is detected that the power focus switch 39 is kept on when the preset time Ts has elapsed, the motor drive is resumed to start the continuous drive routine. In this manner, the fine drive is attained even when the displacement Ac of the image plane per revolution of the coupling 13 is large.

Where it is foreseen that the time required for the drive corresponding to the preset number Ps of feedback pulses is shorter than the preset time Ts, the lens drive speed may be controlled to make the time required for the drive corresponding to the preset number Ps of feedback pulses longer than the set time Ts.

FIG. 7 shows a flow chart for the drive method of FIG. 5. Steps 101 to 103 are identical to those of FIG. 2. In a step 120, the drive amount Ps is calculated. In a step 121, whether the number P of pulses has exceeded the preset drive amount Ps or not is determined. If the number P of pulses counted exceeds Ps, the process proceeds to a step 122 to determine the manipulation status of the power focus switch 39. If the power focus switch 39 is off, the motor drive is stopped in a step 123. This corresponds to FIGS. 5A and 5B. If the power focus switch 39 is kept on, the process proceeds to a step 124 to determine whether the time t from the start has exceeded the preset time Ts or not. If its has not, the motor drive is stopped in a step 125 and the motor drive is kept stopped until the preset time Ts is reached. When the elapsed time exceeds the preset time Ts, the process proceeds to a step 126 to determine whether the power focus switch 39 is on or not. If it is off, the process terminates. If it is on, the motor is started in a step 127. In a step 128, the motor drive is continued until the turn-off of the power focus switch 39 is detected, and when it is turned off, the process proceeds to a step 129 to stop the motor drive.

FIGS. 4A to 4D illustate the effectiveness of the embodiment of the present invention. An abscissa represents a direction of displacement of the focal plane, and an in-focus point corresponds to a preset focal plane (film plane). An ordinate represents an elapsed time. An area shown by dual dot chain lines shows a width d of the focal depth centered at the in-focus point.

In FIG. 4A, no fine drive routine is involved. The motor is driven only while the power focus switch 39 is kept on. As shown by a lens drive locus (a), the adjustment of focusing is difficult to attain and the lens drive may be too much or too short to attain the focusing.

FIG. 4B involves the fine drive routine. The "constant drive amount" is always constant. If the amount is not proper, the fine manipulation of the power focus lower is required many times to reach the in-focus point as shown by the lens drive locus (b). In the opposite case, the drive may go beyond the in-focus point. Thus, it is difficult to attain the focusing.

FIGS. 4C and 4D show the embodiment of the present invention. As shown by lens drive loci (c) and (d), the focusing is attained relatively quickly.

In FIG. 4D, even if the lens is driven past the in-focus point to a point 201, the focusing is attained by one time fine drive of the opposite direction.

In the above embodiment, the "constant amount" of the drive in the fine drive routine is determined in accordance with the focal depth. Other embodiment is explained below.

Figure 6:
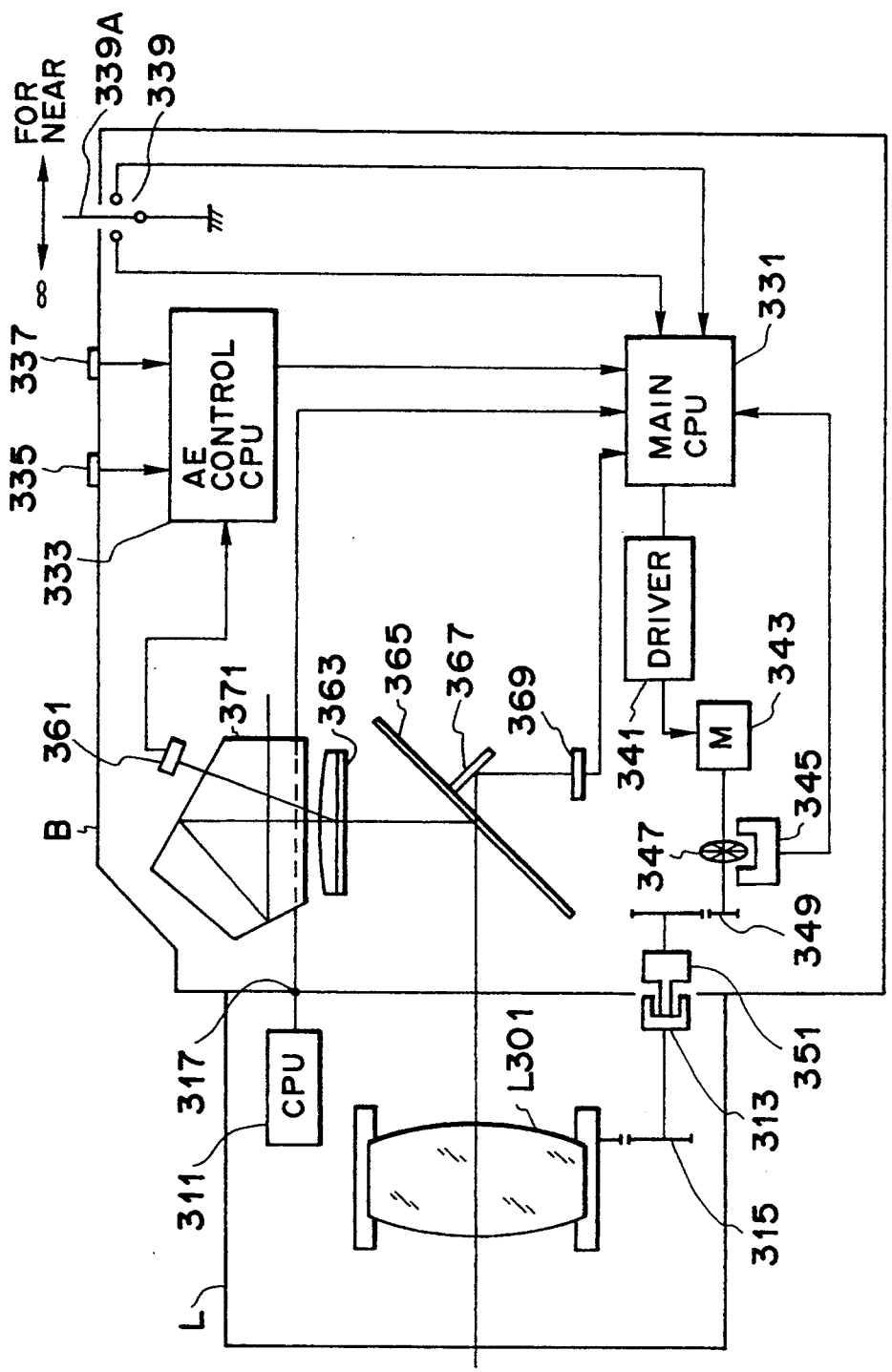
FIG. 6 shows a configuration of another embodiment of the present invention.

FIG. 6 shows a configuration of other embodiment of the present invention. A basic construction is same as that of the embodiment of FIG. 1 and the like elements to those of FIG. 1 are designated by the like numerals plus "300".

In FIG. 6, a light ray through a lens is split into two light beams, one directed to a finder and the other directed to a distance sensor, by a main mirror 365 comprising a half-mirror in a camera body. The light beam directed to the finder passes through a finder screen 363 and is directed to a finder optical system 371. The light beam diffused by the finder screen 363 is captured by a photo-sensor 361 which sends a photo-output to an AE control CPU 333, which in turn detects an object brilliance. The light beam directed to the distance sensor is reflected by a sub-mirror 367 and is directed to a distance sensor 369 disposed at the bottom of the body. The distance sensor 369 sends a contrast of the object, that is, pattern information of the focused image to the main CPU 331 as the information to determine the defocus distance.

As shown in FIG. 6, when the distance sensor is built in the camera body to permit the detection of the contrast of the object, the "constant amount" of the drive in the fine drive routine is set small when the contrast of the object is high, and it is set large when the contrast of the object is low. Since even small defocusing is recognizable when the contrast of the object is high, the amount of drive per manipulation is set small so that the precise focusing is attained in an efficient manner.

Where the distance sensor is built in the camera body to permit the detection of the defocus distance of the object, the "constant amount" of the drive in the fine drive routine is set large when the defocus distance is large, and it is set small when the defocus distance is small. Namely, in the vicinity of the in-focus point, the lens displacement is made small to permit the fine adjustment, and when the focusing is far away from the in-focus state, the lens displacement is set large to quickly bring the focusing-to the in-focus state.

Where the distance sensor is built in the camera body to permit the detection of the defocus distance of the object, the defocus distance and the lens displacement by the motor drive may be compared to determine whether the object is moving or still. If the defocus distance still remains after the drive of the lens by the amount corresponding to the measured defocus distance, it may be decided that the defocus distance corresponding to the displacement of the object remains. In this case, the "constant amount" of the drive in the fine drive routine is set small when the object is moving, and it is set large when the object is still. Since it is not easy to track the focusing where the object is moving, the drive amount per manipulation is made small to facilitate the focusing.

Where the photo-sensor is built in the camera body to permit the detection of the brilliance of the object, the "constant amount" of the drive in the fine drive routine is set large when the brilliance of the object is high, and it is set low when the brilliance of the object is low. Since it is easier to focus under the high brilliance of the object, the drive amount per manipulation is made large to attain the efficient focusing.

Where the distance to the object is detectable by detecting the position of the lens L 301 while it is not shown in FIG. 6, the "constant amount" of the drive in the fine drive routine is set small for a long distance, and it is set small for a short distance. In order to drive the lens by an amount corresponding to a given distance on the object, it is necessary to drive the lens small for the long distance, and large for the short distance. By so selecting the drive amount in the fine drive routine, the rapid focusing is attained.

Where the data on the focal distance of the lens is sent from the lens CPU 311 to the body CPU 331, the "constant amount" of the drive in the fine drive routine is set large for a long focal distance lens, and it is set small for a short focal distance lens. For an object at a given distance, it is necessary to drive the lens more for the long focal distance lens in order to drive the lens by an amount corresponding to a given distance on the object. By so selecting the drive amount in the fine drive routine, the rapid focusing is attained.

Where the data on the open F number of the lens is sent from the lens CPU 311 to the body CPU 331, the "constant amount" of the drive in the fine drive routine may be determined in accordance with the open F number. For example, the lens displacement which imparts the displacement of the image plane corresponding to the focal depth or one-half thereof for the open F number may be selected. In this case, even if the object brilliance changes and the control stop value changes, the "constant amount" does not change for the same lens and the feeling of manipulation remains unchanged.

In the above embodiment, the exchangeable lens camera system having the drive motor built in the body is used. The present invention is equally applicable to a camera system having a motor built in a lens, a camera system having a power focus manipulation member provided in a lens bodytube or a fixed lens camera system.

If the lens drive speed in the coarse focusing in which the power focus manipulation member is continuously manipulated over the predetermined time period is controlled to attain a constant velocity of the image plane, the defocusing speed of the image on finder is constant so that the focusing is attained for various types of lenses with the same visual feeling. The motor speed may be controlled by the data on the number Nb of feedback pulses per unit revolution of the coupling 51 and the displacement Xc of the image plane per unit revolution of the coupling 13. Namely, the displacement X of the image plane per feedback pulse is given by $X = Ac/Nb$ and the period Tp of the feedbpack pulses which attains the velocity Vp of the image plane from the displacement X of the image plane is given by $Tp = X/Vp$ and the motor speed is controlled such that the interval of the feedback pulses is equal to Tp.

In accordance with the present invention, the rapid and correct focusing is attained with the simple power focus manipulation member such as a push button switch or a sea-saw switch.

Further, since the fine drive amount corresponding to the stop value which is set in the photographing mode is selected in the fine adjustment focusing mode, proper fine drive amount can be set for the exchangeable lenses of different open stop numbers and the zoom lens whose stop number varies with zooming.

Further, since the fine drive amount is set as the displacement of the image plane, proper fine drive amount can be set for the zoom lens whose displacement of the image plane varies with zooming and the power focusing is attained without waste.

Where the fine drive amount in the fine adjustment focusing mode is determined in accordance with the contrast of the object, the defocus distance, the precense or absence of the movement of the object, the brilliance of the object, the distance to the object, the focal distance of the photographing lens or the open F number, proper fine drive amount is set and the efficient and rapid focusing is attained.

What is claimed is:

1. In a photographing apparatus for electrically detecting manipulation of a manual manipulation member and driving a photographing lens into an in-focus state by driving a motor in accordance with the manipulation,
a power-driven focusing device comprising:
continuous drive means for driving the lens by driving the motor for a time corresponding to the manipulation time when said manual manipulation member is continuously manipulated longer than a predetermined time; and
fine drive means for driving the motor to drive the lens by a predetermined amount per manipulation which is independent from the manipulation time and variable in accordance with a photographing condition when said manual manipulation member is manipulated shorter than the predetermined time.

2. A power-driven focusing device according to claim 1 wherein said fine drive means selects a lens drive amount determined in accordance with a preset effective F number of the photographing lens, as the predetermined amount of the lens drive.

3. A power-driven focusing device according to claim 1 wherein said fine drive means selects a displacement of an image plane variable in proportion to a focal depth corresponding to an effective F number which is set for the photographing lens at the time of exposure, as the predetermined amount of the lens drive.

4. A power-driven focusing device according to claim 1 wherein said fine drive means selects an arbitrarily settable lens displacement as the predetermined amount of the lens drive.

5. A power-driven focusing device according to claim 1 wherein said fine drive means selects a lens displacement determined in accordance with a contrast of an object as the predetermined amount of the lens drive.

6. A power-driven focusing device according to claim 1 wherein said fine drive means selects a lens displacement determined in accordance with a defocus distance of an object as the predetermined amount of the lens drive.

7. A power-driven focusing device according to claim 1 wherein said fine drive means selects a lens displacement determined in accordance with the presence or absence of movement of an object as the predetermined amount of the lens drive.

8. A power-driven focusing device according to claim 1 wherein said fine drive means selects a lens displacement determined in accordance with a distance to an object as the predetermined amount of the lens drive.

9. A power-driven focusing device according to claim 1 wherein said fine drive means selects a lens displacement determined in accordance with a focal distance of the photographing lens as the predetermined amount of the lens drive.

10. A power-driven focusing device according to claim 1 wherein said fine drive means selects a lens displacement determined in accordance with an open F number of the photographing lens as the predetermined amount of the lens drive.

11. A power-driven focusing device according to claim 3, wherein the focal depth is 1/30 of the F number.

12. A power-driven focusing device according to claim 3, wherein the focal depth is a value corresponding to a print magnification factor of a photograph taken.

13. A photographing method in which a manual manipulation member is manipulated and a photographing lens is driven into an in-focus state by driving a motor in accordance with the manipulation, comprising:
driving the lens by driving the motor for a time corresponding to a manipulation time of said member when said member is continuously manipulated for a time longer than a predetermined time; and
driving the motor to drive the lens by a predetermined lens drive amount per manipulation of said member which is independent from the manipulation time and variable in accordance with a photographing condition when said member is manipulated for a time shorter than the predetermined time.

14. A method according to claim 13 wherein said predetermined lens drive amount is determined in accordance with a preset effective F number of the photographing lens.

15. A method according to claim 13 wherein said predetermined lens drive amount is in accordance with a displacement of an image plane variable in proportion to a focal depth corresponding to an effective F number which is set for the photographing lens at the time of exposure.

16. A method according to claim 13 wherein said predetermined lens drive amount is in accordance with an arbitrarily settable lens displacement.

17. A method according to claim 13 wherein said predetermined lens drive amount is in accordance with a contrast of an object.

18. A method according to claim 13 wherein said predetermined lens drive amount is in accordance with a defocus distance of an object.

19. A method according to claim 13 wherein said predetermined lens drive amount is in accordance with the presence or absence of movement of an object.

20. A method according to claim 13 wherein said predetermined lens drive amount is in accordance with a distance to an object.

21. A method according to claim 13 wherein said predetermined lens drive amount is in accordance with a focal distance of the photographing lens.

22. A method according to claim 13 wherein said predetermined lens drive amount is in accordance with an open F number of the photographing lens.

23. A method according to claim 15 wherein the focal depth is 1/30 of the F number.

24. A method according to claim 15 wherein the focal depth is a value corresponding to a print magnification factor of a photograph taken.

* * * * *